US 6,740,839 B1

(12) United States Patent
Kung et al.

(10) Patent No.: US 6,740,839 B1
(45) Date of Patent: May 25, 2004

(54) TRANSPORTING AND POSITIONING DEVICE FOR TOOL MAGAZINE OF MACHINE TOOL

(75) Inventors: Hsuan-Jen Kung, Douliou (TW); En-Sheng Chang, Taichung (TW); Chin-Mou Hsu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/350,785

(22) Filed: Jan. 24, 2003

(51) Int. Cl.⁷ .............................. B23H 1/00; B23Q 3/155
(52) U.S. Cl. ........................ 219/69.11; 483/1; 483/16
(58) Field of Search ........................ 219/69.11, 69.15; 483/16, 30, 56, 57, 1, 14, 29; 409/212

(56) References Cited

U.S. PATENT DOCUMENTS

| | | | | |
|---|---|---|---|---|
| 4,563,800 A | * | 1/1986 | Bonga | 483/16 |
| 4,624,044 A | * | 11/1986 | Bredow et al. | 483/29 |
| 5,111,573 A | * | 5/1992 | Ito et al. | 483/1 |
| 5,669,866 A | * | 9/1997 | Julian et al. | 483/1 |
| 5,911,888 A | * | 6/1999 | Girardin | 219/69.11 |
| 2001/0027152 A1 | * | 10/2001 | Bolledi | 483/14 |

* cited by examiner

Primary Examiner—Geoffrey S. Evans
(74) Attorney, Agent, or Firm—W. Wayne Liauh (57) ABSTRACT

A transporting and positioning device for tool magazine of a bridge type machine tool comprises a pair of parallel guide-ways on a plate, a seat slidably mounted on the guide-ways for supporting the tool magazine, a drive mechanism including a cylinder, an extendable positioning shaft, a connection block adjacent the plate the connection block including a top hole and being fixed to the table, and a second cylinder having an extendable second positioning shaft; In an operating state of the machine tool, the second positioning shaft is actuated by the second cylinder to project an adjustable distance through the plate to urge against the seat for fastening the seat and the tool magazine. A tool change is performed after fastening the positioning shaft in the hole. The invention is also applicable to EDM.

4 Claims, 10 Drawing Sheets

TRANSPORTING AND POSITIONING DEVICE FOR TOOL MAGAZINE OF MACHINE TOOL

FIELD OF THE INVENTION

The present invention relates to machine tools and more particularly to a transporting and positioning device for tool magazine of a bridge type machine tool with improved characteristics.

BACKGROUND OF THE INVENTION

Figure 1:
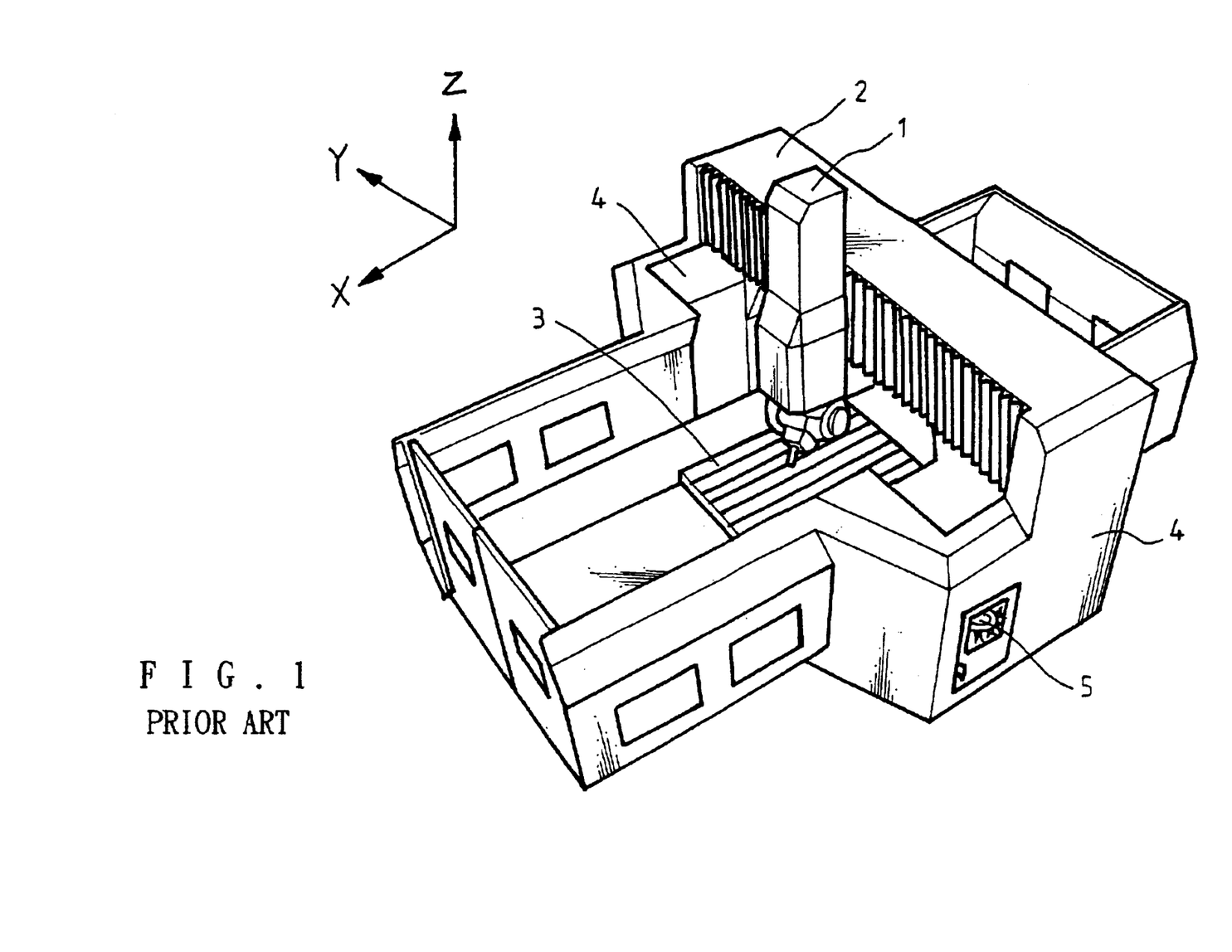
FIG. 1 is a perspective view of a conventional bridge type machine tool.

A conventional machine tool of bridge type is shown in FIG. 1 wherein a spindle 1 is provided adjacent a side of a cross-rail 2. The spindle 1 is able to move along a Y axis with respect to the cross-rail 2 and a Z axis with respect to itself. A table 3 is able to move along an X axis. With such three-axis movement, the machine tool can work on a work piece (not shown). Two columns 4 at both ends of the cross-rail 2 do not interfere with the movement of the spindle 1 along the Y axis. Hence, a tool magazine 5 can be provided adjacent one of the columns 4. The spindle 1 can move to a position above the tool magazine 5 for tool change.

Figure 2:
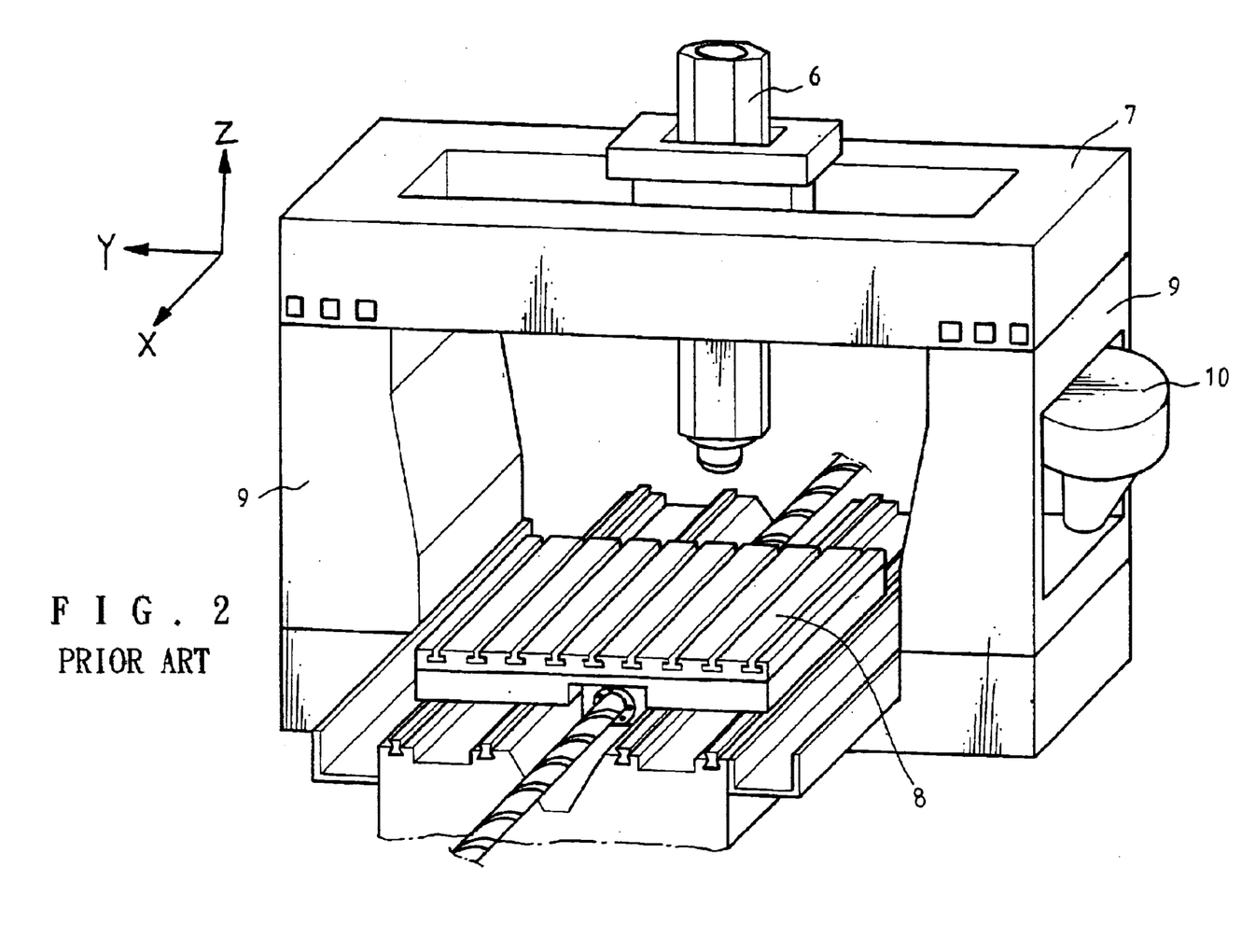
FIG. 2 is a perspective view of another conventional bridge type machine tool.

Another conventional bridge type machine tool is shown in FIG. 2 wherein a spindle 6 is provided on a cross-rail 7 and is moveable along a Y axis defined by the cross-rail 7 and along a Z axis with respect to itself. A table 8 is able to move along an X axis. A travel distance of the spindle 6 does not enable it to access a tool magazine since the movement of the spindle 6 is defined in the cross-rail 7. Once the tool magazine is disposed in the travel distance of the spindle 6 it will interfere with a normal operation of the spindle 6. A solution to this problem is to dig an opening in one of columns 9 for forming a tool magazine 10 therein. In a tool change operation, a cylinder is activated to push the tool magazine 10 to a position within the travel distance of the spindle 6. Next, the spindle 6 is activated to move to a position above the tool magazine 10 for tool change. However, the prior art suffered from several disadvantages. For example, the opening in the column 9 will adversely affect a structural strength of the column 9. Further, the number of tools contained in the tool magazine 10 is limited due to a narrow space in the opening. A prolonging of the length of the cross-rail 7 can decrease a harmonic frequency of the machine tool, resulting in a lower rigidity of the whole construction. A proposal is to form the tool magazine 10 in an outside position rather than in the column 9. However, an additional cylinder is required to push the tool magazine 10 to a position within the travel distance of the spindle 6. Such cylinder is typically not precise in positioning and lacks moving stability. Hence, it is not reliable. An additional servo driving axis without the above drawback of the cylinder can be used to push the tool magazine 10. However, it can significantly increase a manufacturing cost. Hence, a need for improvement exists.

SUMMARY OF THE INVENTION

It is therefore an object of the present invention to provide a transporting and positioning device for tool magazine of a machine tool. The transporting and positioning device is activated by a servo driving system of the machine tool without the installation of an additional drive device. By utilizing the present invention, it is possible of effecting a quick, high precision positioning of the tool magazine and reducing the manufacturing and maintenance costs.

In one aspect of the present invention, there is provided a machine tool comprising, in combination two side columns; a cross-rail interconnecting the columns, the cross-rail having a lengthwise channel; a spindle moveable along the channel and along a lengthwise direction of itself, the spindle having a changeable element at its open end; a moveable table under the cross-rail; a servo driving system below the table; a magazine containing a plurality of elements; and a transporting and positioning device including a plate at a side of one of the columns, a pair of parallel guide-ways on the plate, a sliding seat mounted on the guide-ways for supporting the magazine thereon, a drive mechanism including a cylinder on a side of the seat, a positioning shaft, a connection block adjacent one side of the plate by a predetermined distance, the connection block including a top hole and being fixed to the table, and a second cylinder having a second positioning shaft; wherein in an operating state of the machine tool, the second positioning shaft is actuated by the second cylinder to project an adjustable distance through the plate to urge against the seat for fastening the seat and the tool magazine; and in a tool change, slide the seat along the guide-ways by activating the cylinder until the magazine is below the cross-rail, activate the servo driving system to drive both the table and the connection block to move along a predetermined direction until the hole is aligned with the positioning shaft, drive the positioning shaft into the hole for fastening, activate the spindle to move along the channel until the spindle is aligned with the magazine and within an operable distance so as to change the element of the spindle with one of the elements of the magazine.

In another aspect of the present invention, each of the element of the spindle and the elements of the magazine is a tool.

In still another aspect of the present invention, each of the element of the spindle and the elements of the magazine is an attachment head.

In a further aspect of the present invention, there is provided an EDM comprising, in combination: two side columns; a cross-rail interconnecting the columns, the cross-rail having a lengthwise channel; a ram moveable along the channel and along a lengthwise direction of itself, the ram having a changeable tool at its open end; a moveable table under the cross-rail; a servo driving system below the table; a magazine containing a plurality of tools; and a transporting and positioning device including a plate at a side of one of the columns, a pair of parallel guide-ways on the plate, a sliding seat mounted on the guide-ways for supporting the magazine thereon, a drive mechanism including a cylinder on a side of the seat, a positioning shaft, a connection block adjacent one side of the plate by a predetermined distance, the connection block including a top hole and being fixed to the table, and a second cylinder having a second positioning shaft; wherein in an operating state of the machine tool, the second positioning shaft is actuated by the second cylinder to project an adjustable distance through the plate to urge against the seat for fastening the seat and the tool magazine; and in a tool change, slide the seat along the guide-ways by activating the cylinder until the magazine is below the cross-rail, activate the servo driving system to drive both the table and the connection block to move along a predetermined direction until the hole is aligned with the positioning shaft, drive the positioning shaft into the hole for fastening, activate the ram to move along the channel until the ram is aligned with the magazine and within an operable distance so as to change the tool of the ram with one of the tools of the magazine.

DETAILED DESCRIPTION OF THE PREFERRED EMBODIMENTS

Figure 3:
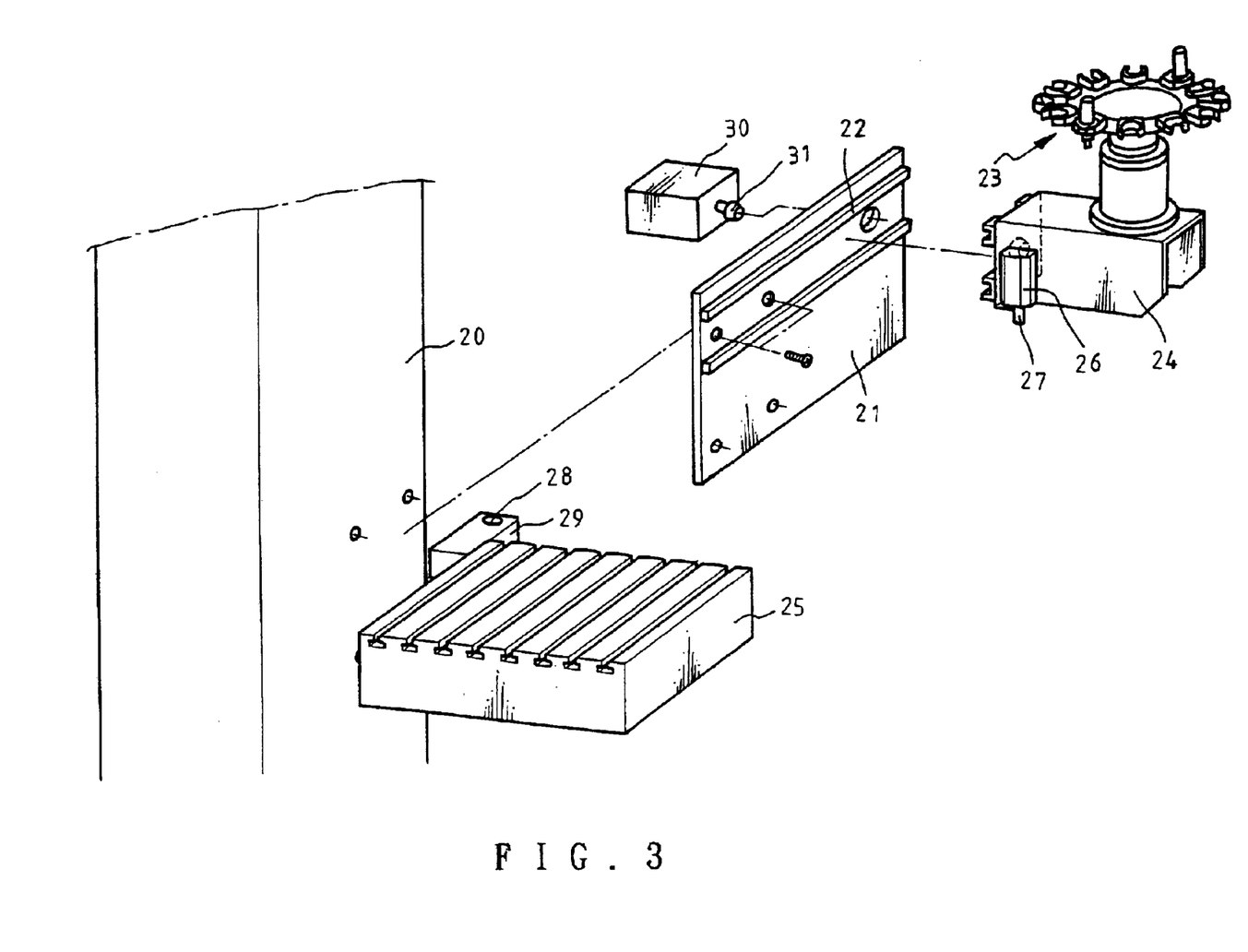
FIG. 3 is an exploded view of a transporting and positioning device for tool magazine incorporating in a first preferred embodiment of machine tool according to the invention.
Figure 4:
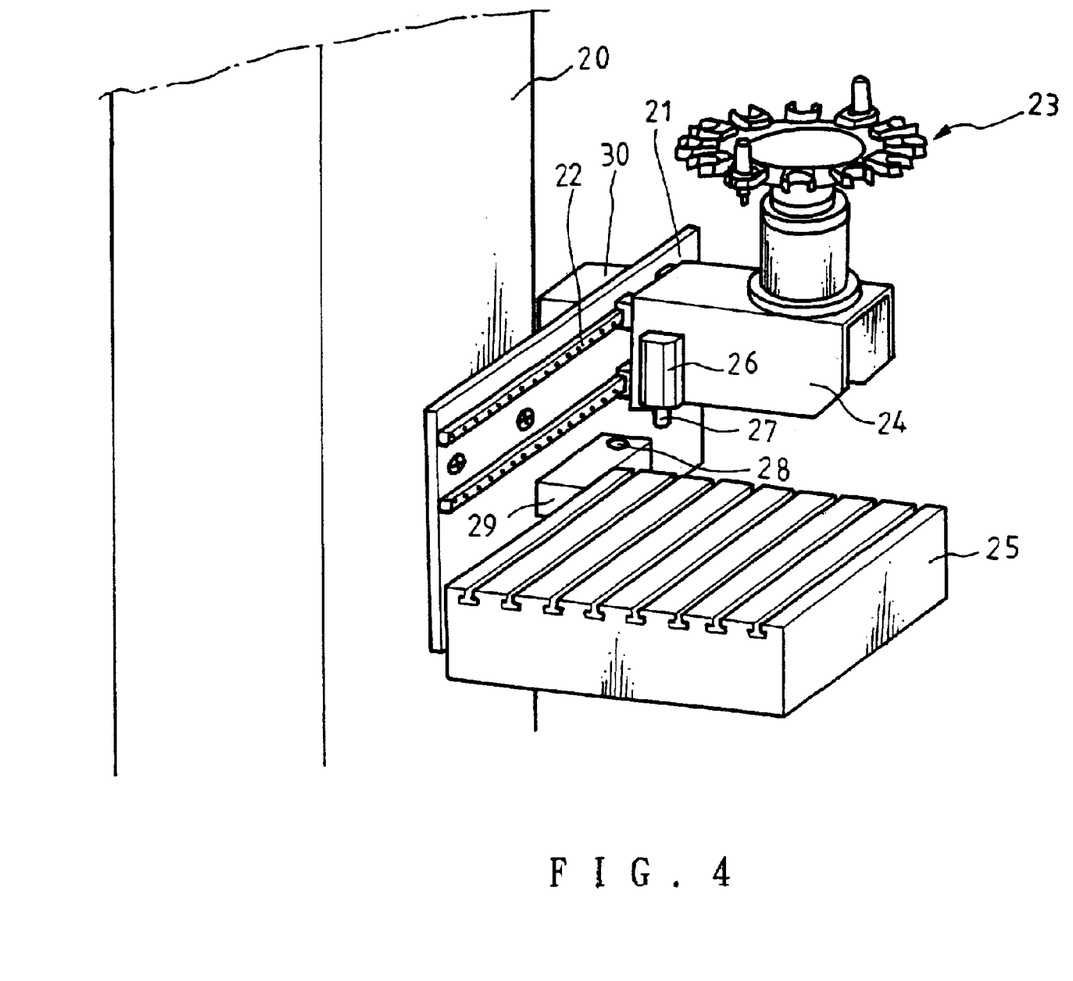
FIG. 4 is a perspective view of the assembled transporting and positioning device.

Referring to FIGS. 3 and 4, there is shown a transporting and positioning device for tool magazine of a bridge type machine tool constructed in accordance with the invention. The transporting and positioning device comprises a plate 21 at a side of a column 20, a pair of parallel guide-ways 22 on the plate 21, a sliding seat 24 mounted on the guide-ways 22, a tool magazine 23 formed on a top of the seat 24, a drive mechanism including a cylinder 26 on a side of the seat 24, the cylinder 26 being capable of driving the seat 24, a positioning shaft 27 actuated by the cylinder 26 to project an adjustable distance from the cylinder 26, and a connection block 29 adjacent one side of the table 25 by a predetermined distance, the connection block 29 including a hole 28 on its top, The transporting and positioning device further comprises a second cylinder 30 having a second positioning shaft 31.

Figure 5:
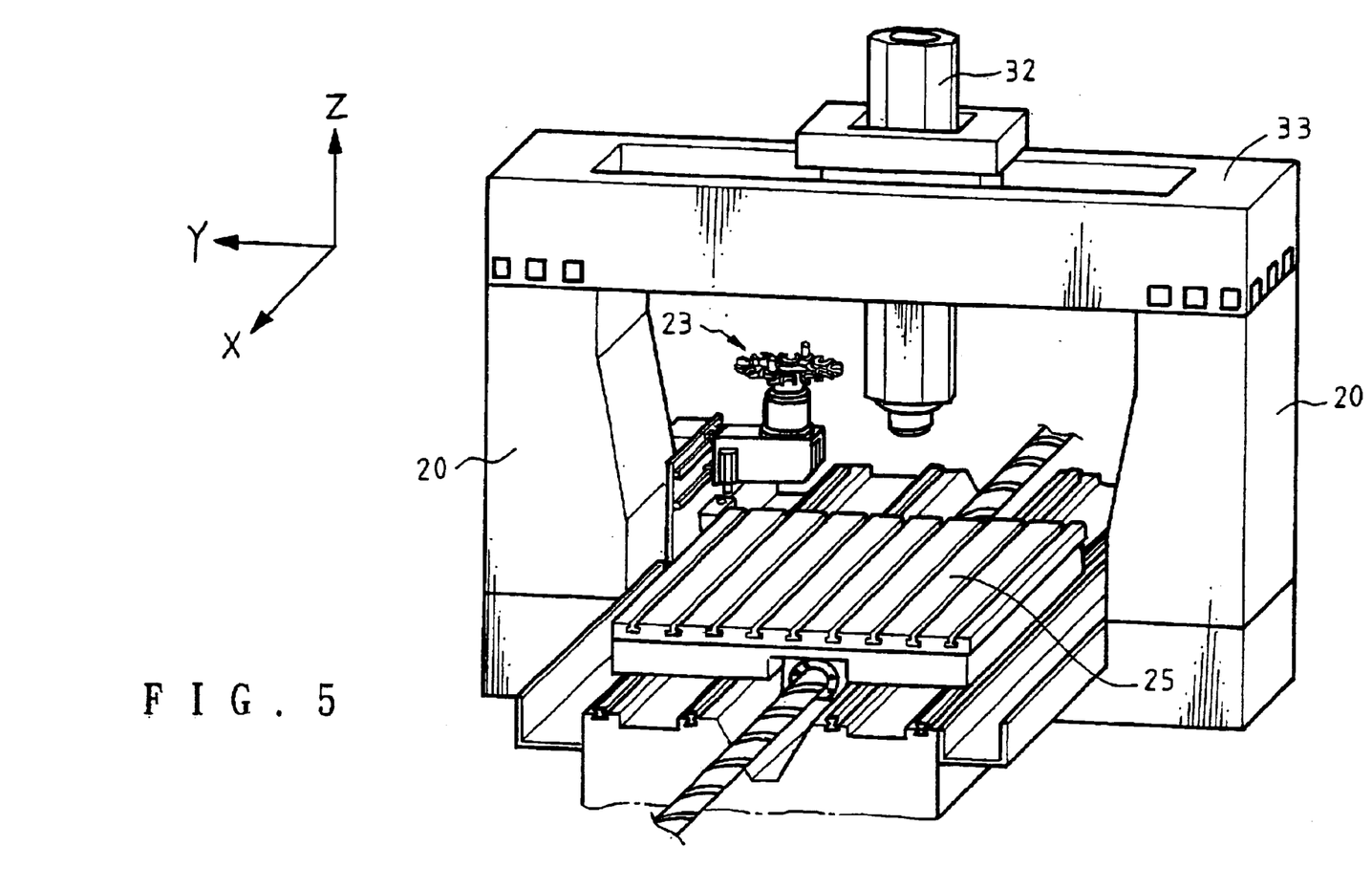
FIG. 5 is a perspective view showing the transporting and positioning device mounted in a machine tool.

Referring to FIG. 5, it is shown that the tool magazine 23 is adjacent one of the columns 20 and between the columns 20. Further, the tool magazine 23 does not interfere with a travel distance of a spindle 32 which moves along a Y axis defined by a cross-rail 33.

Figure 6:
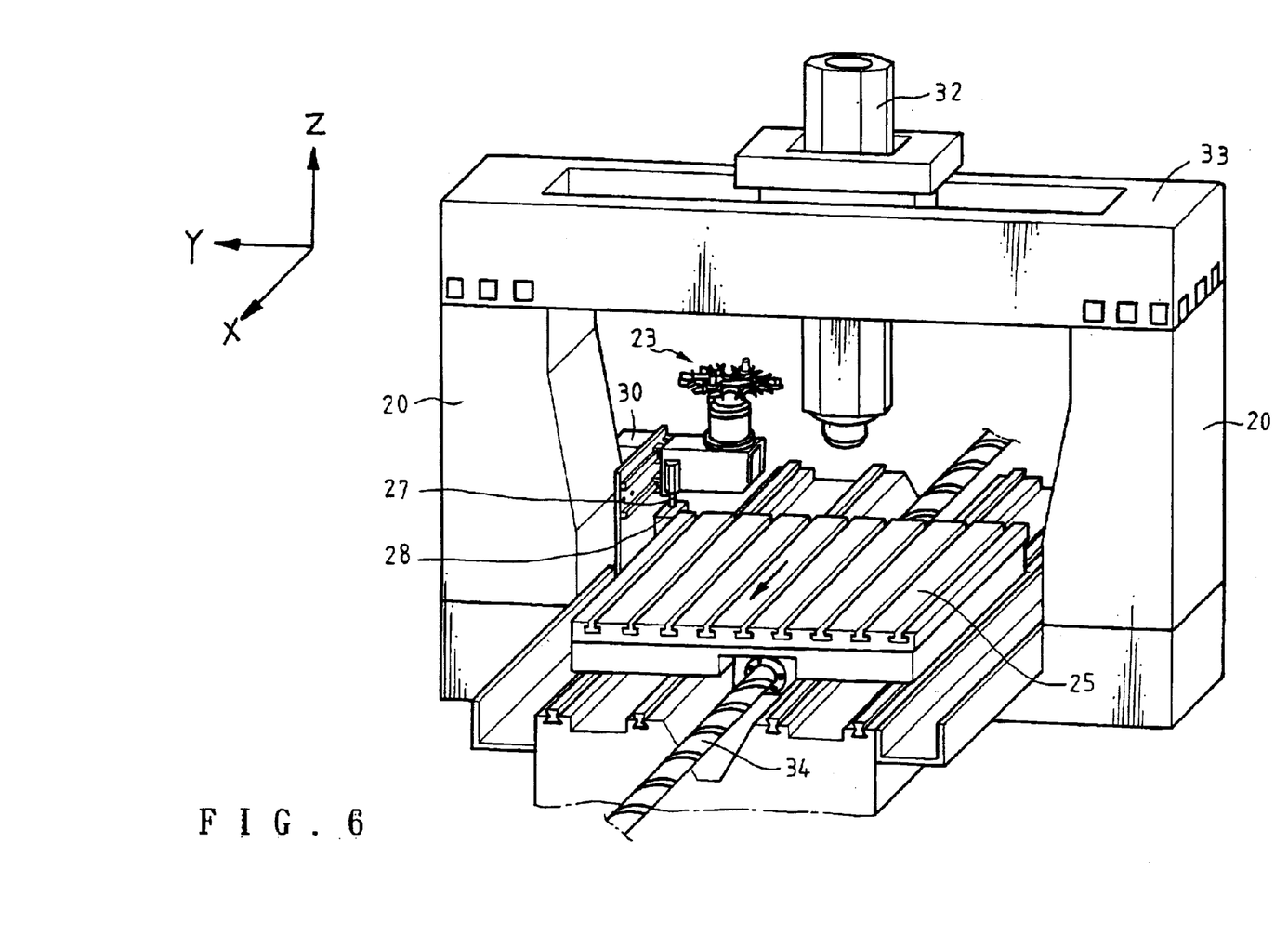
FIGS. 6 and 7 are views similar to FIG. 5 showing two opposite movements of table in the machine tool respectively.
Figure 7:
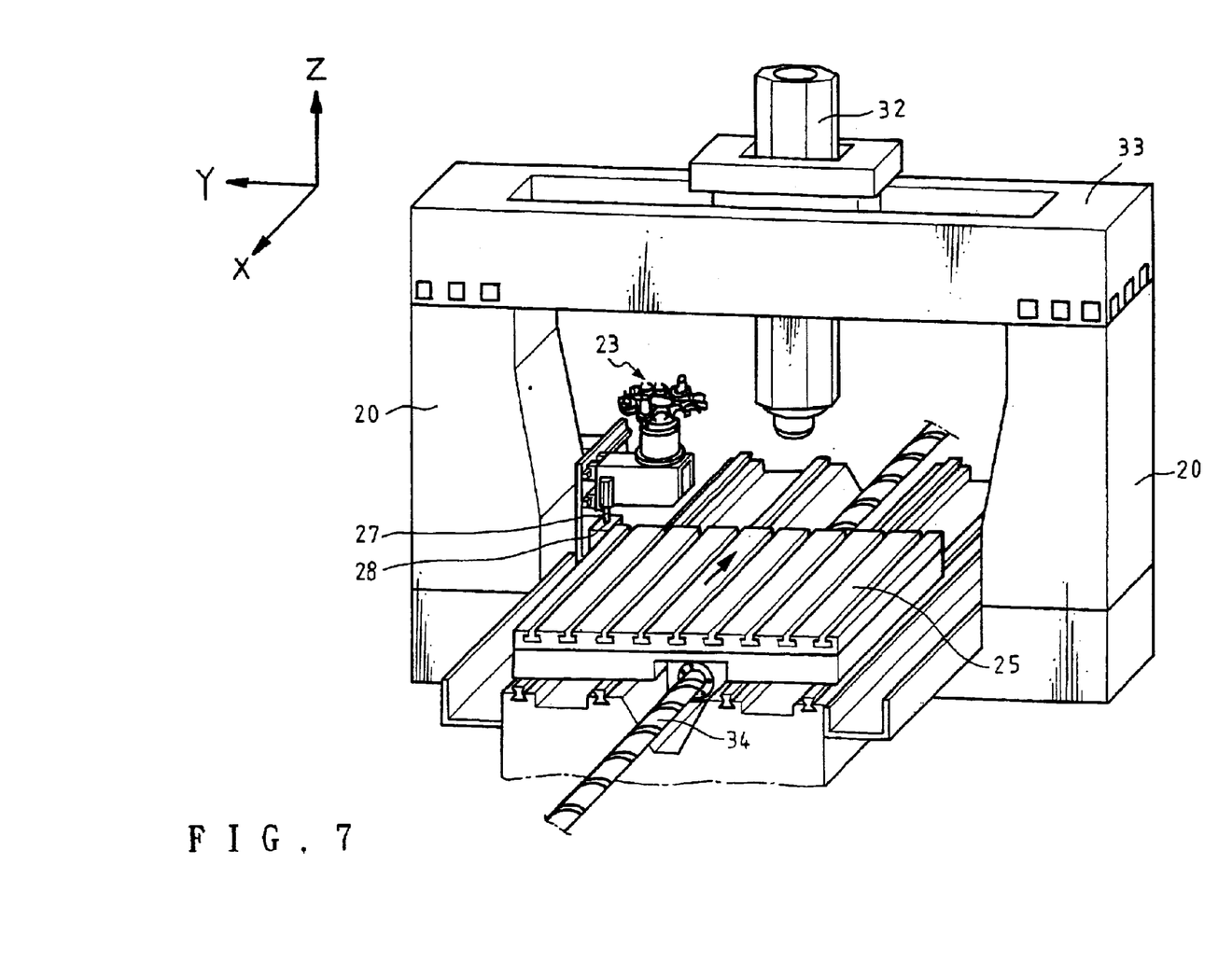

Referring to FIGS. 6 and 7, there is further provided a servo driving system 34 below the table 25. Following is a description of tool change operation. First, slide the seat 24 along the guide-ways 22 by activating the cylinder 26 until the tool magazine 23 is right below the cross-rail 33 reachable by the spindle 32. Next, activate the servo driving system 34 to drive both the table 25 and the connection block 29 to move along an X axis until the hole 28 is aligned with the positioning shaft 27. Next, drive the positioning shaft 27 into the hole 28 for fastening. Next, activate the spindle 32 to move along the cross-rail 33 until the spindle 32 is aligned with the tool magazine 23 and within an operable distance. Finally, make a tool change of the spindle 32 with the tool magazine 23. After changing tool, a reverse operation is performed to return the machine tool to its operating position.

Figure 8:
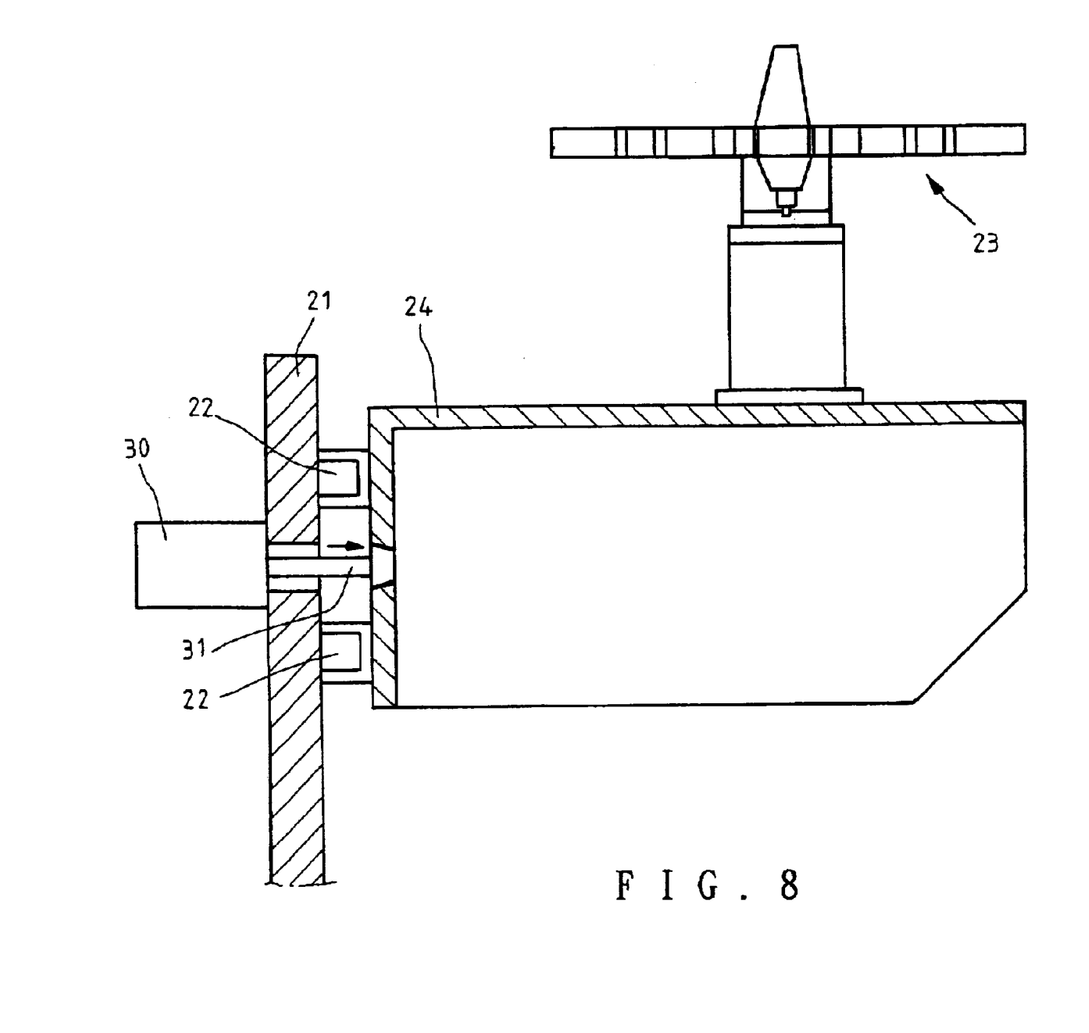
FIG. 8 is a view similar to FIG. 5 where tool magazine is fastened.

Referring to FIG. 8, in a normal operating state of the machine tool, i.e., the tool change is not performed, the second positioning shaft 31 is actuated by the second cylinder 30 to project an adjustable distance through the plate 21 to urge against the seat 24 for fastening the seat 24 and the tool magazine 23. Otherwise, the seat 24 may slide along the guide-ways 22 to cause the tool magazine 23 to move out of an anchoring position with respect to the table.

Figure 9:
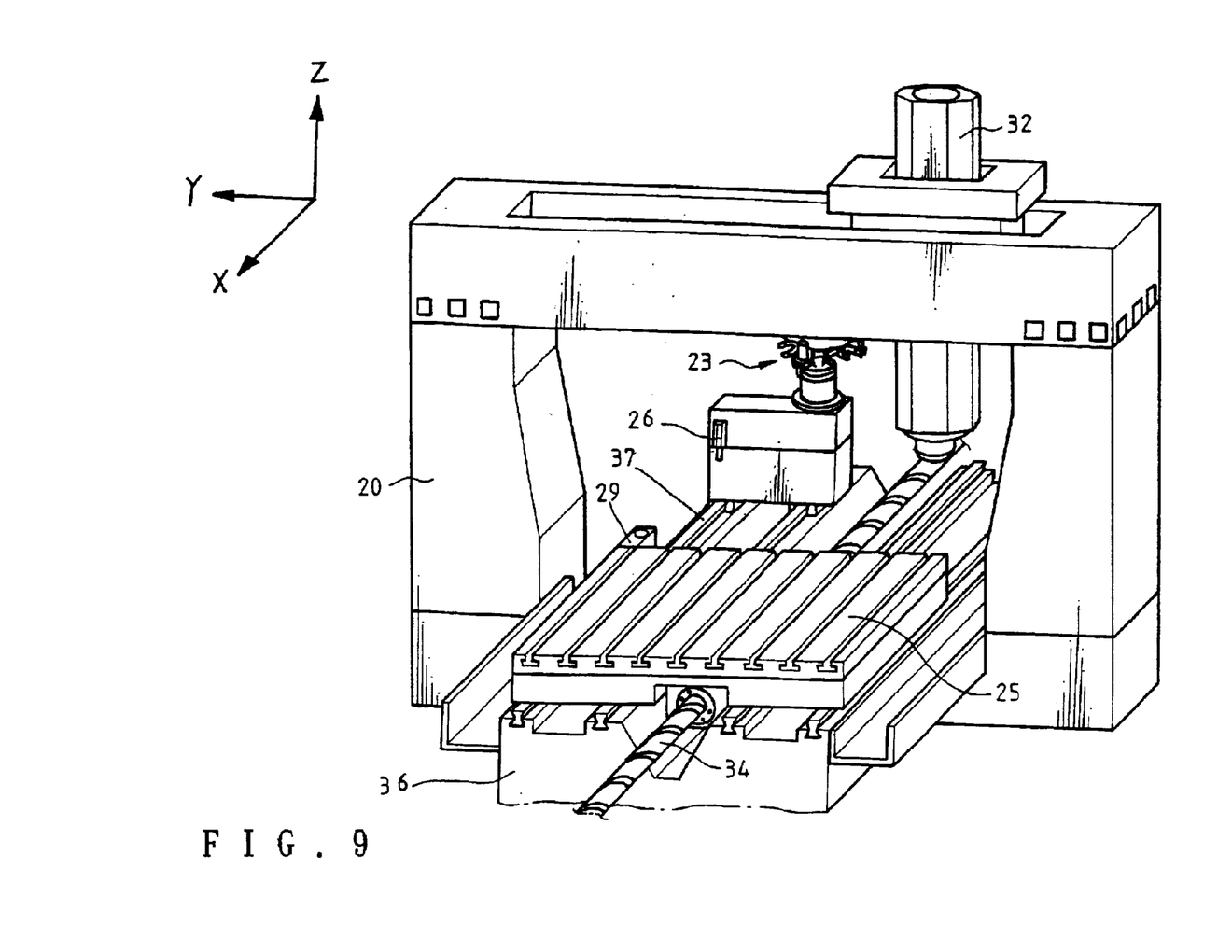
FIG. 9 is a perspective view of the transporting and positioning device for tool magazine incorporating in a second preferred embodiment of machine tool according to the invention.

Referring to FIG. 9, there is shown the transporting and positioning device incorporating in a second preferred embodiment of machine tool according to the invention. In the embodiment, a bed 36 is prolonged to permit a pair of parallel guide-ways 37 to mount thereon. The tool magazine 23 is normally provided at a rear end of the bed 36 beyond an operating range of the spindle 32. A tool change operation of the embodiment is similar to that of the first embodiment. In brief, activate the servo driving system 34 to drive the table 25 and the tool magazine 23 toward each other until the hole 28 is aligned with the positioning shaft 27. Next, drive the positioning shaft 27 into the hole 28 for fastening. Next, activate the spindle 32 to a position aligned with the tool magazine 23 and within an operable distance. Finally, make a tool change of the spindle 32 with the tool magazine 23. After changing tool, a reverse operation is performed to return the machine tool to its operating position.

Note that the tool change of the invention can be applied to an attachment head change of the machine tool. In this case, tools contained in a tool magazine are replaced by attachment heads.

Figure 10:
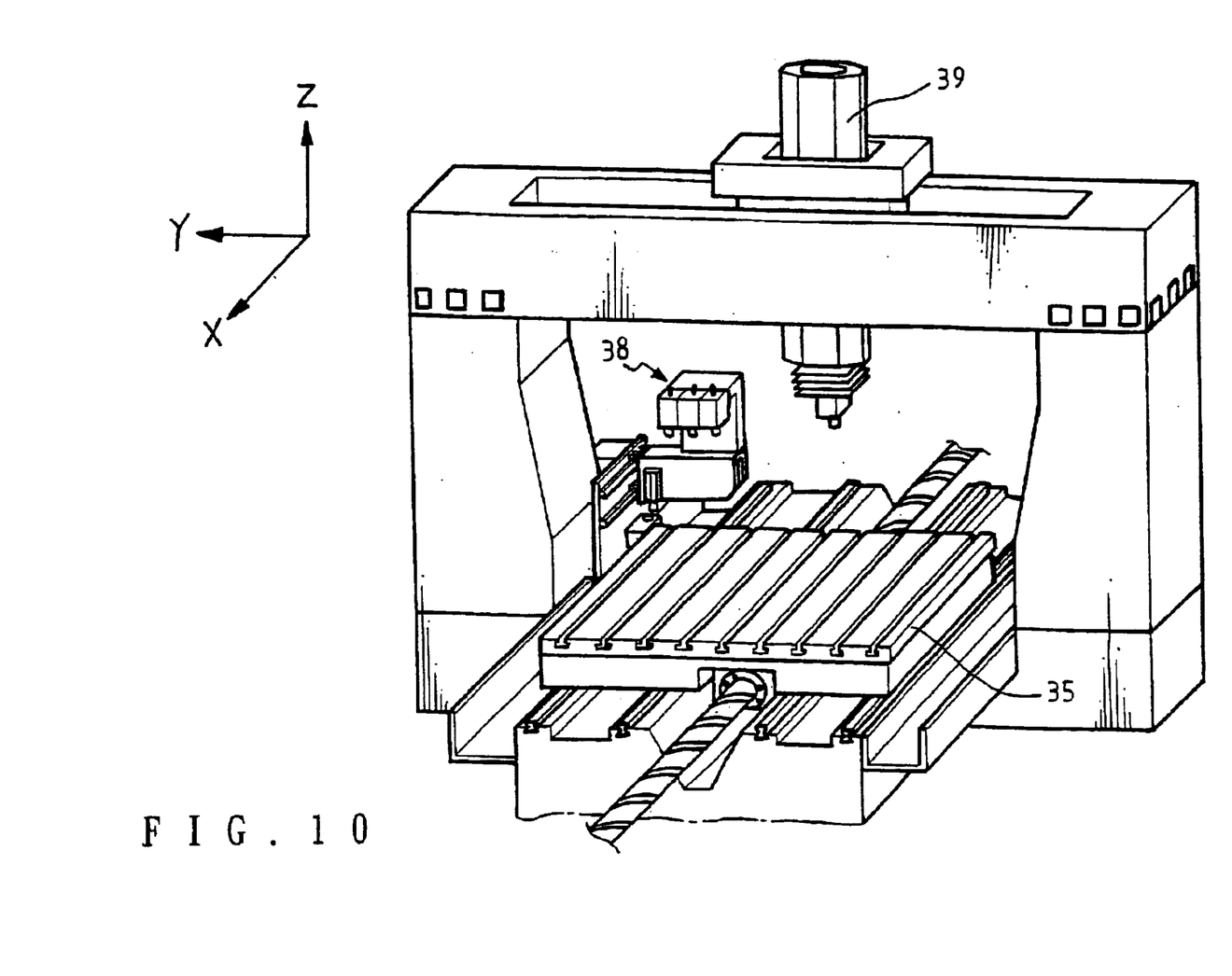
FIG. 10 is a perspective view showing the transporting and positioning device mounted in an EDM.

Referring to FIG. 10, the invention is also applicable to tool change of a bridge type EDM (electric discharge machine). Similar to the first embodiment, a tool magazine 38 and a ram 39 can be driven to align with each other prior to effecting a tool change.

While the invention has been described by means of specific embodiments, numerous modifications and variations could be made thereto by those skilled in the art without departing from the scope and spirit of the invention set forth in the claims.

What is claimed is:

1. A machine tool comprising, in combination:

two side columns;

a cross-rail interconnecting the columns, the cross-rail having a lengthwise channel;

a spindle moveable along the channel and along a lengthwise direction of itself, the spindle having a changeable element at its open end;

a moveable table under the cross-rail;

a servo driving system below the table;

a magazine containing a plurality of elements; and a transporting and positioning device including a plate at a side of one of the columns, a pair of parallel guide-ways on the plate, a sliding seat mounted on the guide-ways for supporting the magazine thereon, a drive mechanism including a cylinder on a side of the seat, a positioning shaft, a connection block adjacent one side of the table by a predetermined distance, the connection block including a top hole and being fixed to the table, and a second cylinder having a second positioning shaft;

wherein in an operating state of the machine tool, the second positioning shaft is actuated by the second cylinder to project an adjustable distance through the plate to urge against the seat for fastening the seat and the tool magazine; and in a tool change, slide the seat along the guide-ways by activating the cylinder until the magazine is below the cross-rail, activate the servo driving system to drive both the table and the connection block to move along a predetermined direction until the hole is aligned with the positioning shaft, drive the positioning shaft into the hole for fastening, activate the spindle to move along the channel until the spindle is aligned with the magazine and within an operable distance so as to change the element of the spindle with one of the elements of the magazine.

2. The machine tool of claim 1, wherein each of the element of the spindle and the elements of the magazine is a tool.

3. The machine tool of claim 1, wherein each of the element of the spindle and the elements of the magazine is an attachment head.

4. An EDM (electric discharge machine) comprising, in combination:

two side columns;

a cross-rail interconnecting the columns, the cross-rail having a lengthwise channel;

a ram moveable along the channel and along a lengthwise direction of itself, the ram having a changeable tool at its open end;

a moveable table under the cross-rail;

a servo driving system below the table;

a magazine containing a plurality of tools; and a transporting and positioning device including a plate at a side of one of the columns, a pair of parallel guide-ways on the plate, a sliding seat mounted on the guide-ways for supporting the magazine thereon, a drive mechanism including a cylinder on a side of the seat, a positioning shaft, a connection block adjacent one side of the table by a predetermined distance, the connection block including a top hole and being fixed to the table, and a second cylinder having a second positioning shaft;

wherein in an operating state of the machine tool, the second positioning shaft is actuated by the second cylinder to project an adjustable distance through the plate to urge against the seat for fastening the seat and the tool magazine; and in a tool change, slide the seat along the guide-ways by activating the cylinder until the magazine is below the cross-rail, activate the servo driving system to drive both the table and the connection block to move along a predetermined direction until the hole is aligned with the positioning shaft, drive the positioning shaft into the hole for fastening, activate the ram to move along the channel until the ram is aligned with the magazine and within an operable distance so as to change the tool of the ram with one of the tools of the magazine.

\* \* \* \* \*